United States Patent
Aggas

(10) Patent No.: US 6,506,272 B1
(45) Date of Patent: Jan. 14, 2003

(54) VACUUM IG UNIT WITH SEAL FOR PUMP-OUT APERTURE

(75) Inventor: Steven L. Aggas, Tempe, AZ (US)

(73) Assignee: Guardian Industries Corp., Auburn Hills, MI (US)

(*) Notice: Subject to any disclaimer, the term of this patent is extended or adjusted under 35 U.S.C. 154(b) by 0 days.

(21) Appl. No.: 09/542,990

(22) Filed: Apr. 4, 2000

(51) Int. Cl.[7] ............................. C03C 27/00; E06B 3/24
(52) U.S. Cl. ...................................................... 156/109
(58) Field of Search ........................... 428/34; 156/107, 156/109

(56) References Cited

U.S. PATENT DOCUMENTS

| | | |
|---|---|---|
| 49,167 A | 1/1865 | Stetson |
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |
| 2,962,409 A | 11/1960 | Ludlow et al. |
| 3,441,924 A | 4/1969 | Peek et al. |
| 3,742,600 A | 7/1973 | Lowell |
| 3,902,883 A | 9/1975 | Bayer |
| 3,912,365 A | 10/1975 | Lowell |
| 3,936,553 A | 2/1976 | Rowe |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,514,450 A | 4/1985 | Nowobilski et al. |
| 4,824,215 A | 4/1989 | Joseph et al. |
| 4,874,461 A | 10/1989 | Sato et al. |
| 4,924,243 A | 5/1990 | Sato et al. |
| 4,983,429 A | 1/1991 | Takayanagi et al. |
| 5,157,893 A | 10/1992 | Benson et al. |
| 5,234,738 A | 8/1993 | Wolf |
| 5,247,764 A | 9/1993 | Jeshurun et al. |
| 5,315,797 A | 5/1994 | Glover et al. |
| 5,399,406 A | 3/1995 | Matsuo et al. |
| 5,489,321 A | 2/1996 | Tracy et al. |
| 5,499,128 A | 3/1996 | Hasegawa et al. |
| 5,596,981 A | 1/1997 | Soucy |
| 5,657,607 A | 8/1997 | Collins et al. |
| 5,664,395 A | 9/1997 | Collins et al. |
| 5,739,882 A | 4/1998 | Shimizu et al. |
| 5,855,638 A | 1/1999 | Demars |
| 5,897,927 A | 4/1999 | Tsai et al. |
| 5,902,652 A | 5/1999 | Collins et al. |
| 6,049,370 A | 4/2000 | Smith, Jr. et al. |

FOREIGN PATENT DOCUMENTS

| | | |
|---|---|---|
| FR | 2 482 161 | 11/1981 |
| FR | 2752012 | * 2/1998 |
| JP | 10-326572 | 12/1998 |
| WO | WO 00/04268 | 1/2000 |

OTHER PUBLICATIONS

EP Search Report dated Aug. 13, 2001.
Griffiths et al, "Fabrication of Evacuated Glazing at Low Temperature," *Solar Energy*, vol. 63, No. 4, pp. 243–249 (1998). No month.

* cited by examiner

Primary Examiner—Donald J. Loney
(74) Attorney, Agent, or Firm—Nixon & Vanderhye P.C.

(57) ABSTRACT

A vacuum insulating glass (IG) unit. In certain embodiments, the internal cavity is evacuated (i.e., pumped out) via a pump-out aperture. A cover with one or more sealing element(s) may be provided over the pump-out aperture so that during the pump-out process air flows out of the internal cavity and through space(s) between adjacent sealing elements or sealing element portions. Following evacuation or pumping out, the sealing element(s) is/are heated and the sealing member may be pressed downwardly toward the substrate. This causes the heat-softened sealing element(s) to expand horizontally and merge with one another so as to form a hermetic seal around the pump-out aperture and between the sealing member and the substrate.

8 Claims, 5 Drawing Sheets

VACUUM IG UNIT WITH SEAL FOR PUMP-OUT APERTURE

RELATED APPLICATIONS

Commonly owned U.S. Ser. Nos. 09/348,281 now U.S. Pat. No. 6,365,242 "PERIPHERAL SEAL FOR VACUUM IG WINDOW UNIT" filed Jul. 7, 1999; 09/303,550 now U.S. Pat. No. 6,326,067 entitled "VACUUM IG PILLAR WITH DLC COATING" filed May 3, 1999; 09/404,659 now U.S. Pat. No. 6,336,984 filed Sep. 24, 1999 entitled "VACUUM IG WINDOW UNIT WITH PERIPHERAL SEAL AT LEAST PARTIALLY DIFFUSED AT TEMPER"; and 09/440,697 now U.S. Pat. No. 6,436,492 filed Nov. 16, 1999 entitled "VACUUM IG WINDOW UNIT WITH FIBER SPACERS", are all hereby incorporated herein by reference.

This invention relates to a vacuum insulating glass (IG) unit. More particularly, this invention relates to a vacuum IG unit having a seal for sealing an area proximate an aperture used during pump-out operations.

BACKGROUND OF THE INVENTION

Vacuum IG units are known in the art. For example, see U.S. Pat. Nos. 5,664,395, 5,657,607, 5,891,536 and 5,902,652, the disclosures of which are all hereby incorporated herein by reference.

Prior art FIGS. 1–2 illustrate a conventional vacuum IG unit. IG unit 1 includes two spaced apart sheets of glass 2 and 3 which enclose an evacuated or low pressure space 16 therebetween. Glass sheets 2 and 3 are interconnected by peripheral or edge seal of fused solder glass 4 and have an array of support spacers/pillars 5 therebetween.

Pump out tube 8 is sealed by solder glass 9 to a double drilled aperture or hole which passes from an interior surface of glass sheet 2 to the bottom of recess 11. Double drilling typically means that two separate drilling diameters are used during formation of the hole so that its diameter is different at one surface of the substrate than at the other surface of the substrate. Two separate drilling steps may be required. A vacuum is attached to tube 8 (prior to the tube being sealed) so that the interior space 16 between sheets 2 and 3 can be evacuated to create a low pressure area. After evacuation, an end of tube 8 is melted to seal the vacuum in space 16. Optionally, getter 12 may be provided within recess 13 to counteract any rise in pressure due to any out-gassing from the glass.

FIG. 3 is a side cross sectional view of another conventional vacuum IG window unit. This unit differs from the FIG. 1–2 unit, in that its glass sheets are of different sizes so as to provide an L-shaped step around the unit's periphery, on which edge seal 4 is to be at least partially located. Pump-out tube 8 in FIG. 3 projects outwardly above a surface of substrate 3, even after evacuation of space 16 and sealing of the tube. Moreover, the FIG. 3 unit includes low-E coating 6 on the interior major surface of glass sheet 3.

Different techniques have been utilized in evacuating vacuum IG units, and different types of pump-out structures have been discussed.

U.S. Pat. No. 5,902,652 to Collins is incorporated herein by reference and discloses, for example, a double drilled pump-out hole or aperture in its FIGS. 4a and 4b. A pump-out tube extends through the hole and is used in evacuating the internal space. The tube is sealed to the interior surface of the substrate with solder glass cement.

U.S. Pat. No. 5,897,927 discloses the use of a pump-out tube to evacuate an internal space within a glass enclosure. The pump out tube is sealed to the unit using glass frit paste.

Unfortunately, the pump-out techniques and procedures disclosed in the aforesaid '652 and '927 patents are less than desirable for at least the following reasons. The use of pump-out tubes that must be permanently sealed to glass substrate(s) is not always desirable. Nor is the need for double drilling holes. These are burdensome and/or expensive.

It is apparent from the above that there exists a need in the art for a vacuum IG unit, and corresponding method of making the same, in which the pump-out structure and techniques for evacuating the interior are simplified and less burdensome and/or costly.

This invention will now be described with respect to certain embodiments thereof, accompanied by certain illustrations.

SUMMARY OF THE INVENTION

An object of this invention is to provide a vacuum IG window unit including a wafer or plate type sealing member used in sealing off an area proximate a pump-out aperture.

Another object of this invention is to eliminate the need for double-drilling of pump-out holes.

Another object of this invention is to provide a simplified technique for evacuating an internal area of a vacuum IG unit and subsequently sealing the same.

Another object of this invention is to fulfill any and/or all of the above-listed objects and/or needs.

Generally speaking, this invention fulfills any or all of the above described objects or needs by providing a method of evacuating an internal cavity of a vacuum insulating glass (IG) window unit, the method comprising the steps of:

providing first and second spaced apart glass substrates defining a space therebetween;

providing an aperture or passage, at least one end of which accesses the space between the substrate;

providing a plurality of spacers disposed between the first and second glass substrates for spacing the substrates from one another in order to maintain the space therebetween;

positioning a sealing member over at least an end of the passage or aperture;

evacuating the space by causing gas or air to flow therefrom through the passage or aperture and thereafter through spaces defined between sealing elements located between the sealing member and either the aperture or the first substrate.

This invention further fulfills any or all of the above described needs and/or objects by providing a method of evacuating an internal cavity of an insulating panel, the method comprising the steps of:

providing first and second spaced apart substrates defining a space therebetween;

providing an aperture in the first substrate;

providing a plurality of spacers disposed between the first and second substrates;

providing an edge seal around an edge portion of at least one of the substrates, the edge seal being provided at least partially between the first and second substrates;

positioning a sealing member over the aperture in a manner such that the sealing member is spaced from the first substrate; and evacuating the space between the substrates by causing gas or air from the space to flow therefrom through the aperture in the first substrate and thereafter through at least one space defined between portions of at least one sealing element attached to a surface of the sealing member.

This invention further fulfills any or all of the above-described needs and/or objects by providing a thermally insulating glass panel comprising:

first and second spaced apart glass substrates defining a space therebetween having a pressure less than atmospheric;

a pump-out aperture defined in the first substrate;

a plurality of spacers disposed between said first and second glass substrates for spacing said substrates from one another in order to maintain the space therebetween;

a sealing member over the aperture; and at least one sealing element disposed between said sealing member and a major surface of said first substrate in order to seal off an area proximate said pump-out aperture, said at least one sealing element being deformable when subjected to heat so that a pump-out opening therein can be closed after a pumping-out procedure has been performed.

IN THE DRAWINGS

DETAILED DESCRIPTION OF CERTAIN EMBODIMENTS OF THIS INVENTION

Figure 2:
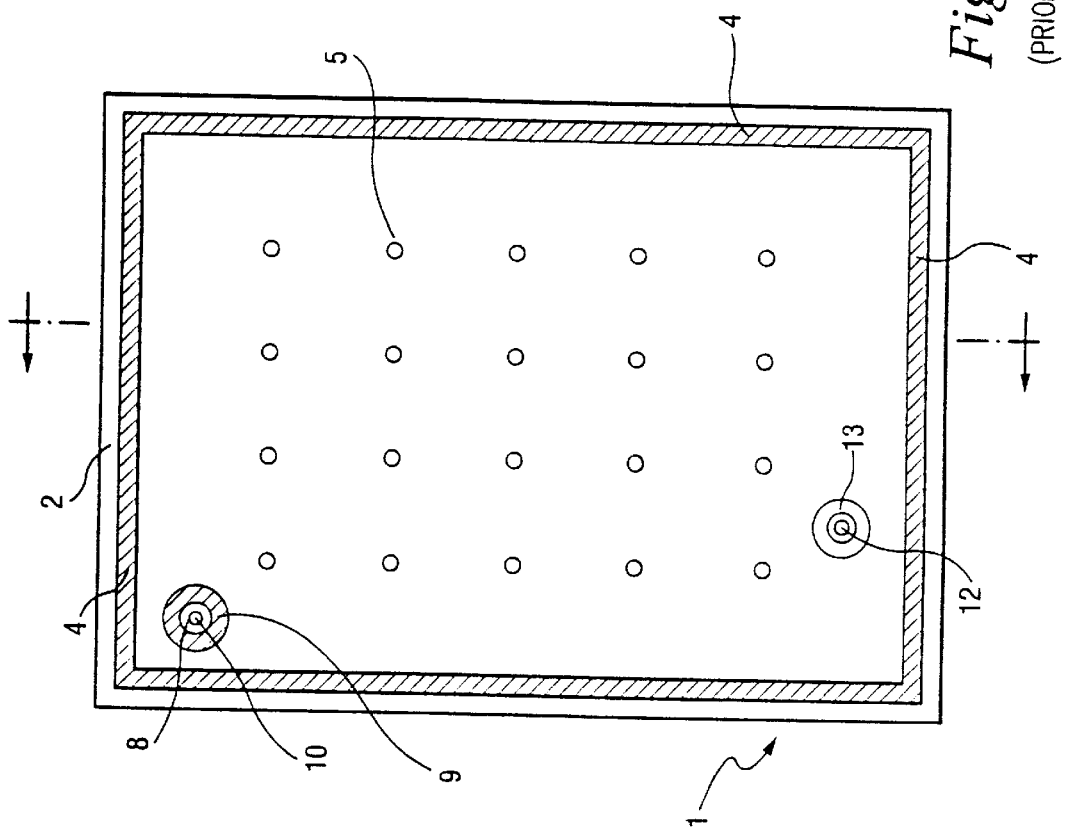
FIG. 2 is a top partial cross-sectional view of the FIG. 1 vacuum IG unit, absent the top glass substrate.

Referring now more particularly to the accompanying drawings in which like reference numerals indicate like parts throughout the several views.

Certain embodiments of this invention relate to a vacuum IG window unit, and a method of evacuating the same and/or subsequently hermetically sealing off a pump-out aperture used during the pump-out process. During the manufacture of a vacuum IG window unit according to certain embodiments herein, an aperture (i.e., pump-out aperture or hole) is formed (e.g., drilled) in one of the substrates. Thereafter, a sealing member (e.g., wafer or metal/glass plate) having a plurality of solid or quasi-solid spaced apart sealing elements attached to a surface thereof, is placed on the substrate over the aperture. The spaced apart sealing elements support the sealing member on the substrate, so that the sealing member is spaced from the substrate and the aperture defined therein. In order to evacuate (or vacuum out) the internal cavity between the substrates, a vacuum or pump-out device is placed over the sealing member and used to suck air, gas, and/or the like out of the cavity. The spaces between the spaced apart sealing elements enable air to be drawn out of the cavity and sucked off by the vacuum device (i.e., the air from the cavity proceeds out of the aperture in the substrate and through the space(s) defined between the sealing elements and into the vacuum device). Following evacuation, the sealing elements are heated and downward pressure may be applied to the sealing member. As the sealing elements deform due to the heat, and the sealing member is pushed toward the substrate, a seal (e.g., hermetic seal) is formed between the sealing member and the substrate thereby sealing the pump-out aperture.

Herein, edges of opposing vacuum IG substrates are hermetically sealed by at least one edge or peripheral seal 4. As can be seen in the drawings, "peripheral" and "edge" seals herein do not mean that the seal(s) are located at the absolute periphery or edge of the unit, but instead mean that the seal is at least partially located at or near (e.g., within about two inches of) an edge of at least one substrate of the unit.

Figure 1:
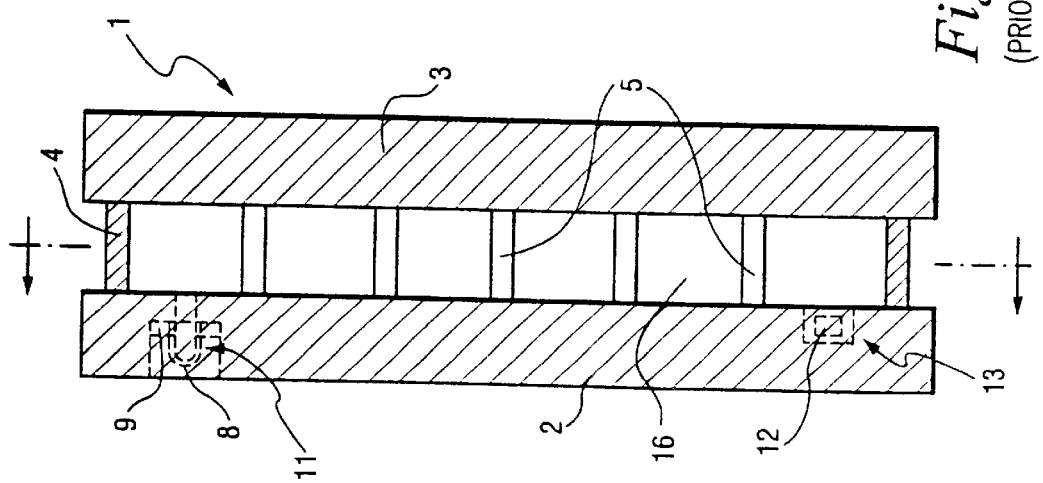
FIG. 1 is a prior art side partial cross-sectional view of a conventional vacuum IG window unit.
Figure 3:
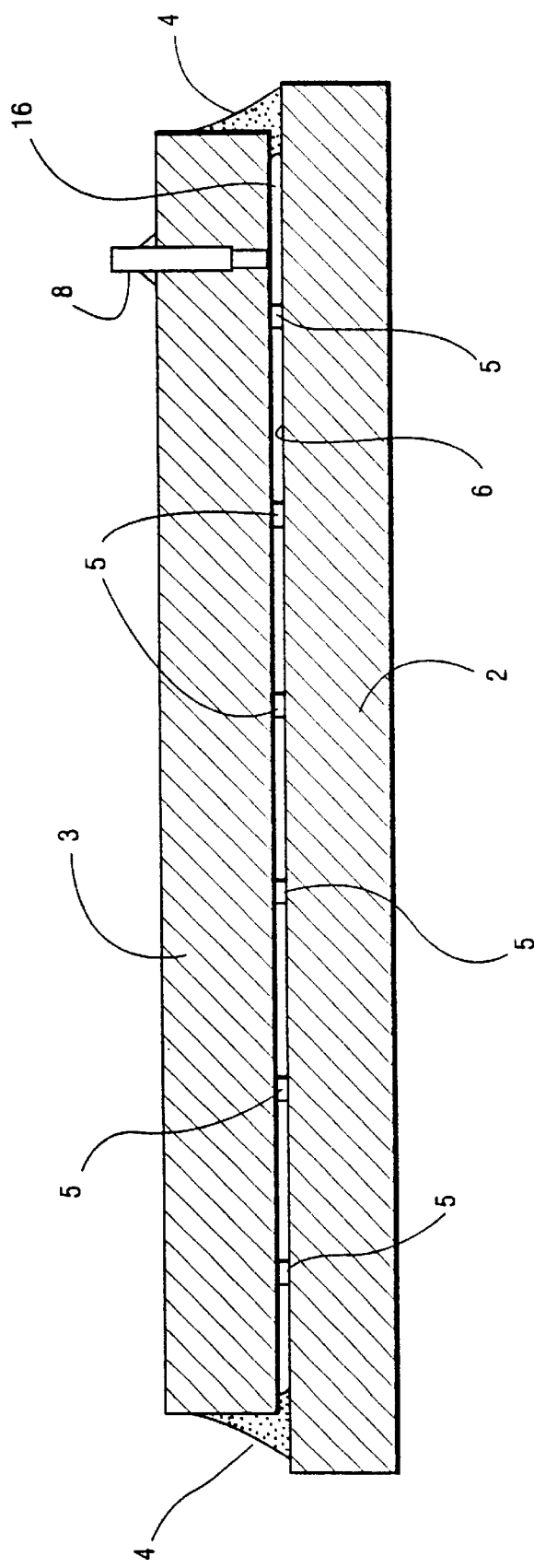
FIG. 3 is a side cross-sectional view of another conventional vacuum IG window unit.
Figure 4:
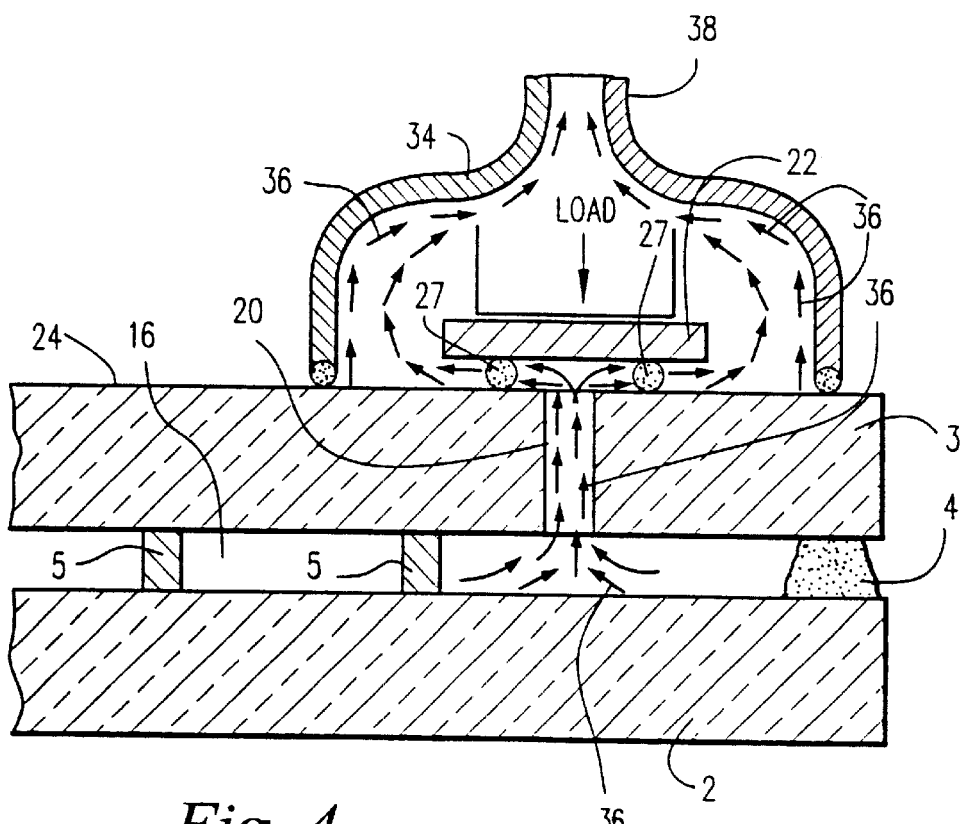
FIG. 4 is a partial side cross-sectional view of a portion of a vacuum IG window unit schematically illustrating a process during which the internal cavity is evacuated.

FIG. 4 illustrates a pump-out or evacuation procedure being performed in order to evacuate internal cavity or space 16 of a vacuum IG window unit according to an embodiment of this invention. The vacuum IG window unit includes first and second opposing glass substrates 2 and 3 (tempered or non-tempered) which are spaced from one another by spacers or pillars 5 which maintain low pressure space 16 between the substrates. In certain preferred embodiments, substrates 2 and 3 are soda-lime-silica float glass. Hermetic peripheral or edge seal 4, provided between the substrates 2 and 3, seals off low pressure space 16 from surrounding atmospheric pressure. The peripheral/edge seal 4 (one or multiple piece edge seals may be used in different embodiments) may be located entirely between the opposing substrates, as shown in FIGS. 1 and 4. However, as shown in FIG. 3, the peripheral/edge seal 4 may instead be located partially between the substrates, and partially in L-shaped step area at the periphery of the unit. Thus, the opposing substrates 2 and 3 may be of approximately the same size, or alternatively may be of different sizes as shown in FIG. 3. In certain embodiments of this invention, peripheral or edge seal 4 may be made of or include solder glass, indium, an alkali silicate (e.g. sodium silicate, potassium silicate, etc.), or any other suitable material in different embodiments of this invention. In certain embodiments, an additional edge seal(s) (i.e. one or more additional seals) may be provided so that the edge seal 4 may be, for example, a two or three seal system.

Vacuum IG units according to different embodiments of this invention may be used as residential or commercial windows. The evacuation of space 16 eliminates or reduces heat transport between glass substrates 2 and 3 due to gaseous conduction and convection. In addition, radiative heat transport between substrates 2 and 3 can be reduced to a low level by providing a low emittance (low-E) coating(s) on a surface of one or both of sheets 2, 3. High levels of thermal insulation can thus be achieved. Low gaseous thermal conduction may be achieved when the pressure in space 16 is reduced to a level e.g., equal to or below about $0.5 \times 10^{-3}$ Torr, more preferably below about 0.1 mTorr, or $10^{-4}$ Torr, and most preferably below about $10^{-6}$ Torr of atmospheric pressure. The hermetic edge sealing system 4, including one or more edge seals, substantially eliminates any ingress or outgress of gas or air to/from low pressure space 16.

Still referring to FIG. 4, an array of spacers or pillars 5 is provided between substrates 2 and 3 in order to maintain separation of the two approximately parallel glass sheets against atmospheric pressure. In certain embodiments, all spacers 5 are of approximately the same size and/or material. However, in other embodiments, there may be different sizes of spacers 5 in the same vacuum IG unit. In certain embodiments, the density of spacers (i.e., the number of spacers per unit area) may be greater in certain areas than in other areas, or alternatively, the density of the spacers may be approximately uniform throughout the entire unit. Spacers 5 may be made of, for example, any of glass, solder glass, metal, ceramic, single crystal hexagonal alumina, glass fibers, stainless steel, or any other suitable material in different embodiments. In certain embodiments of this invention, spacers 5 have a maximum thickness or height of from about 10 to 100 $\mu$m. Spacers 5 may be shaped as spheres, cylinders, ovals, rectangles, squares, or any other suitable shape in different embodiments of this invention.

Figure 6:
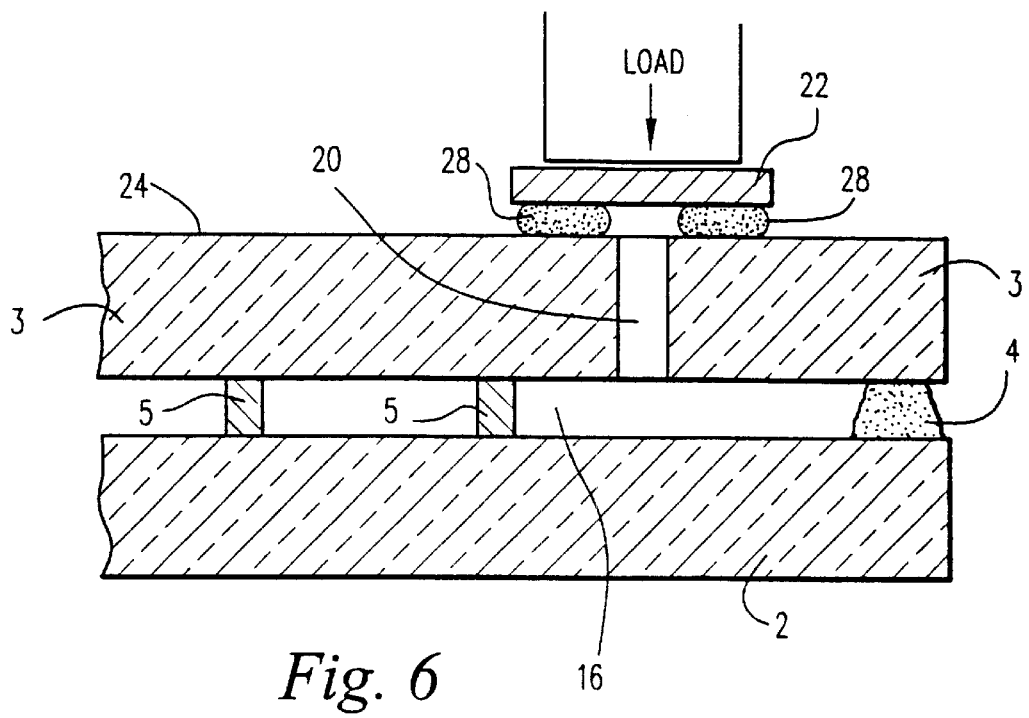
FIG. 6 is a side cross-sectional view of the vacuum IG unit of FIG. 4, illustrating the pump-out aperture or hole being sealed after the interior cavity has been evacuated.

Referring to FIGS. 4 and 6, after interior cavity 16 has been evacuated, pump-out aperture 20 in substrate 3 is sealed off from the surrounding atmosphere by sealing member (i.e., cover) 22 and hermetic seal 28. Aperture 20 is basically a passage or passageway which connects the interior space 16 to the exterior of the vacuum IG unit so that air or gas can be vacuumed out of space 16 via aperture/passageway 20. Sealing member 22 may be, for example, a (i) sheet of glass, (ii) a sheet of metal, such as aluminum, copper or the like, or (iii) a wafer of silicon, plastic, silicon oxide, or any other suitable material, in different embodiments. Sealing member 22 may be shaped in the form of a plate, a sheet, a rectangle, or any other suitable shape in different embodiments so long as the member 22 covers and is capable of sealing off pump-out aperture 20. Referring to FIG. 6, sealing member 22 is adhered to the exterior major surface 24 of substrate 3 over top of aperture 20 by sealing material 28. Sealing material 28 may be of or include a hermetic sealing material such as indium (In), an indium alloy, or any other type of metal or other material capable of providing the desired seal.

Figure 5:
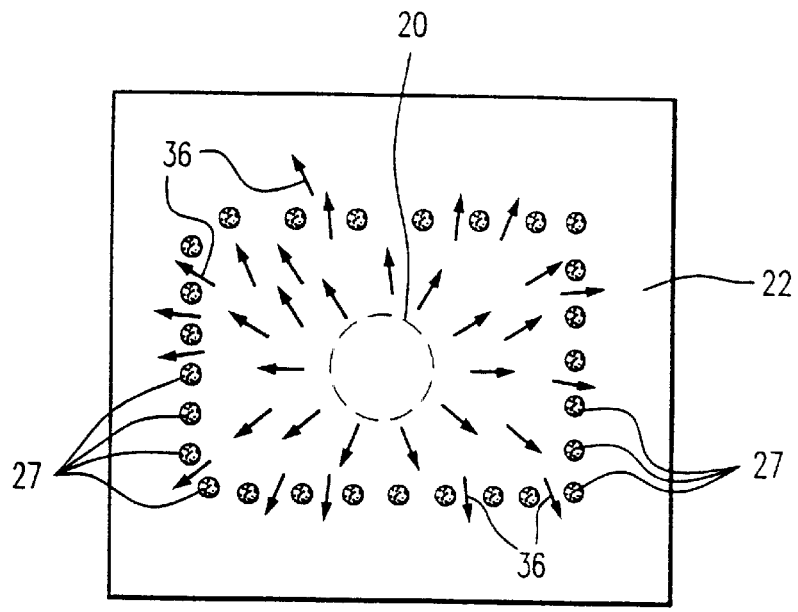
FIG. 5 is a bottom plan view of the sealing wafer or plate member used in the process shown in FIG. 4 (with the pump-out aperture in the underlying substrate shown in broken lines).

Referring to FIGS. 4–6, it will now be described how a vacuum IG window unit is manufactured in accordance with an exemplary embodiment of this invention. Substrates 2 and 3 are provided. An aperture 20 is drilled or otherwise formed in substrate 3, so as to extend all the way therethrough from one major surface 24 to the other. Spacers 5 are placed on substrate 2 in an array so as to be spaced from one another. Edge seal material 4 is deposited on substrate 2 proximate an edge thereof around the entire perimeter. Substrate 3 is brought down over substrate 2 so that spacers 5 support the substrates relative to one another and define cavity 16 therebetween. Hermetic edge seal 4 is formed (e.g., by heating and allowing the edge seal material to cure).

Sealing member or cover 22 is provided. As shown in FIG. 5, a plurality of spaced apart sealing elements 27 are provided on a major surface of member 22. In certain embodiments, sealing elements 27 may be arranged in a spaced-apart fashion in the form of a ring or square on the surface of member 22 as shown in FIG. 5. Sealing elements 27 are in a solid or quasi-solid state at this point in the process.

After the edge seal 4 has been formed, sealing member or cover 22 with sealing elements 27 adhered thereto is brought down to a position over pump-out aperture 20 as shown in FIG. 4, so that sealing elements 27 support member 22 over top of aperture 20. Optionally, a load (e.g., spring biased member) may be used to hold or bias member 22 downward against the exterior major surface 24 of substrate 3. A vacuum or pump-out member 34 is then brought down and positioned over and around aperture 20 and member 22 as shown in FIG. 4. A vacuum or the like is then utilized to evacuate cavity 16, so that air and/or gas 36 from the cavity 16 flows out of the cavity through aperture 20 as shown in FIG. 4. After the air 36 is sucked out of the cavity 16 through aperture 20, the air 36 flows underneath member 22 and through the spaces defined between sealing elements 27 as shown in FIGS. 4–5. After flowing between the spaces between elements 27, the air is sucked off through a tube 38 of the vacuum unit. In such a manner, internal cavity 16 is evacuated to a low pressure (i.e., a pressure less than atmospheric).

After the evacuation process, aperture 20 must be sealed to maintain the vacuum in space 16. To do this, sealing elements 27 are heated. For example, if the sealing elements 27 are of indium or an indium alloy, they may be heated to a temperature of from about 80–200 degrees C. In any event, sealing elements 27 are heated to a degree sufficient to cause them to deform (e.g., soften, melt, or quasi-melt). Elements 27 may be heated with a laser, infrared (IR) heater, or any other suitable localized heating device/process. The heating (which may be combined with downward pressure from a load as shown in FIG. 4) causes adjacent sealing elements 27 to flow toward and merge/melt with one another to form a complete sealing ring 28 around the aperture 20 and between member 22 and substrate 3, as shown in FIG. 6. During this process, sealing member or cover 22 moves closer to surface 24 of substrate 3 as the sealing elements expand outwardly and merge with one another to form the ring seal 28. Upon cooling, ring seal 28 preferably provides a hermetic seal which seals off aperture 20 and thus low pressure cavity 16 from the surrounding atmosphere. After the hermetic aperture seal 28 has been formed, the vacuum unit 34 and load are removed.

Figure 7:
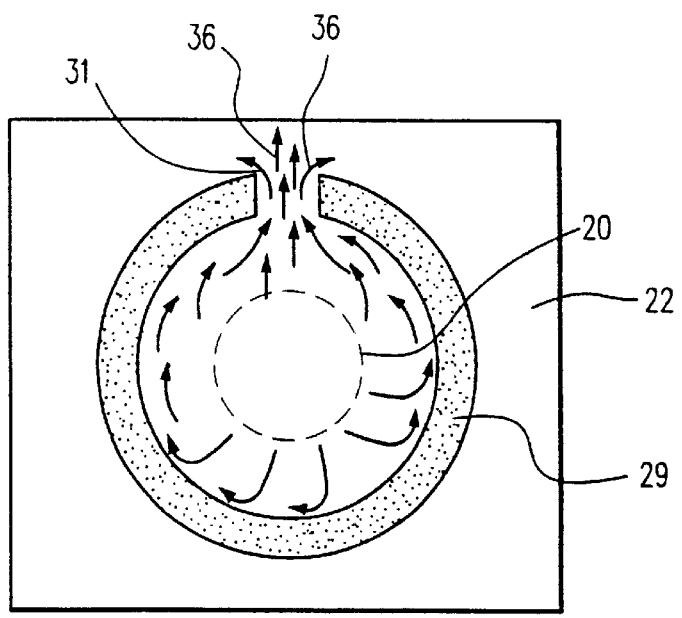
FIG. 7 is a bottom plan view of a sealing wafer or plate member used in the process of FIG. 4 according to another embodiment of this invention (with the pump-out aperture in the underlying substrate shown in broken lines).

FIG. 7 illustrates a sealing member or cover 22 according to another embodiment of this invention, with the underlying pump-out aperture 20 being shown in broken lines. This embodiment differs from the embodiment described above because instead of a plurality of sealing elements, only one sealing element 29 is provided. Sealing element 29, as illustrated in FIG. 7, is in the form of a horseshoe, partial circle, or partial rectangle, with an opening(s) 31 defined in a portion thereof between opposing ends of the element 29. When member 22 is placed on the substrat e over top of aperture 20, opening 31 allows air and/or gas 36 to be pumped out of the internal cavity 16 through aperture 20 and ultimately through opening 31 (see FIG. 7) and off into the vacuum apparatus. In other words, during the pump-out process air sucked out of the cavity and aperture 20 flows through opening(s) 31 and off into the vacuum apparatus. Following evacuation, sealing element 29 is heated and deformed due to the heat and/or downward applied pressure so that opening 31 is closed. Once opening 31 has been closed, the sealing element 29 is cooled and the hermetic seal 28 is formed around the pump-out aperture. Element(s) 28, 29 may be of indium (or an indium-inclusive alloy), or any other suitable deformable material in different embodiments of this invention. In still further embodiments of this invention, additional opening(s) 31 may be formed in element 29 of the FIG. 7 embodiment, so that the air/gas 36 has more room and/or paths to take during its outflow from internal space 16.

Figure 8:
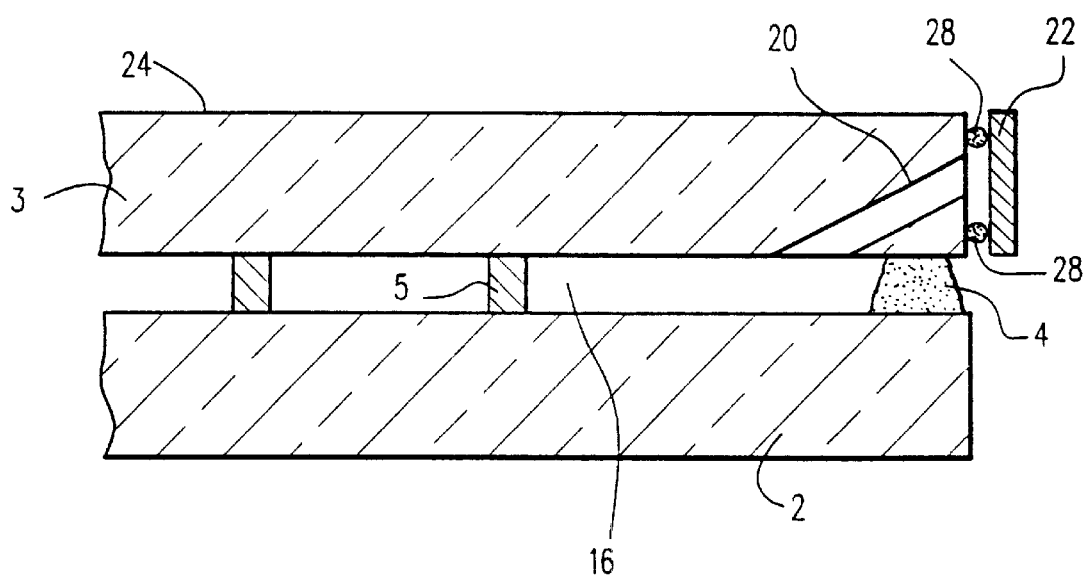
FIG. 8 is a side cross-sectional view of a vacuum IG unit according to another embodiment of this invention where the pump-out aperture is provided in a side or edge surface of one of the substrates and the sealing member and sealing elements are provided over the aperture at the side or edge of the IG unit.

FIG. 8 illustrates another embodiment of this invention, which differs from the above-described embodiments in that the pump-out aperture or passage (or passageway) 20 extends between a side or edge of substrate 3 and interior space 16. As illustrated in FIG. 8, sealing member 22 is provided over an end of the aperture/passage 20 and is at least partially parallel to an edge or side of substrate 3. As in the previous embodiments described above, air or gas is vacuumed out of space 16 through aperture/passageway 20 and into the vacuum apparatus, through space(s) between adjacent sealing elements which are later heated and deformed to form hermetic seal 28. In still other embodiments of this invention, the pump-out aperture 20 may be defined in edge seal 4 at a side or edge of the IG unit, with member 22 being provided over the aperture defined in the edge seal at a side or edge of the unit.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A method of evacuating an internal cavity of a vacuum insulating glass (IG) window unit, the method comprising:

providing first and second spaced apart glass substrates defining an interior space therebetween;

providing a passage extending to the interior space between the substrates;

providing a plurality of spacers disposed between the first and second glass substrates for spacing the substrates from one another in order to maintain the interior space therebetween;

positioning a sealing member over an end of the passage;

evacuating the interior space by causing gas and/or air to flow therefrom through the passage and thereafter through spaces defined between deformable sealing elements which support the sealing member over the passage, at least some of the deformable sealing elements being laterally spaced apart from one another so that they do not contact one another.

2. The method of claim 1, further comprising heating the sealing elements to a temperature sufficient to cause the sealing elements to at least soften, and wherein the passage comprises an aperture defined in the first substrate, and wherein the sealing elements are attached to a surface of the sealing member.

3. The method of claim 2, further comprising causing the sealing elements to expand outwardly when heated so as to merge with one another so as to form a hermetic seal between the sealing member and the first substrate.

4. The method of claim 3, wherein the hermetic seal seals off the aperture and internal cavity from external atmosphere.

5. The method of claim 1, wherein the sealing elements are initially provided on a bottom surface of the sealing member in a spaced apart manner.

6. The method of claim 5, wherein the sealing elements are initially spaced from one another and aligned in a manner surrounding an end of the passage.

7. The method of claim 6, wherein the sealing elements comprise indium, and the sealing member is in the form of a, plate or wafer.

8. A method of evacuating an internal cavity of an insulating glass (IG) window unit, the method comprising:

providing first and second spaced apart glass substrates defining an interior space therebetween;

providing an aperture in the first substrate extending to the interior space between the substrates;

providing a plurality of spacers disposed between the first and second glass substrates for spacing the substrates from one another in order to maintain the interior space therebetween;

positioning a sealing member over an end of the aperture in the first substrate;

evacuating the interior space by causing gas and/or air to flow therefrom through the aperture in the first substrate and thereafter through spaces defined between separate and distinct non-contacting sealing elements that are laterally spaced apart from one another and which support the sealing member over the passage, at least some of the deformable sealing elements being spaced outwardly from the aperture in the first substrate.

* * * * *